Dec. 3, 1940.  W. HERBERT  2,224,049
PROCESS FOR THE PRODUCTION OF HYDROCARBONS
Filed Nov. 24, 1937
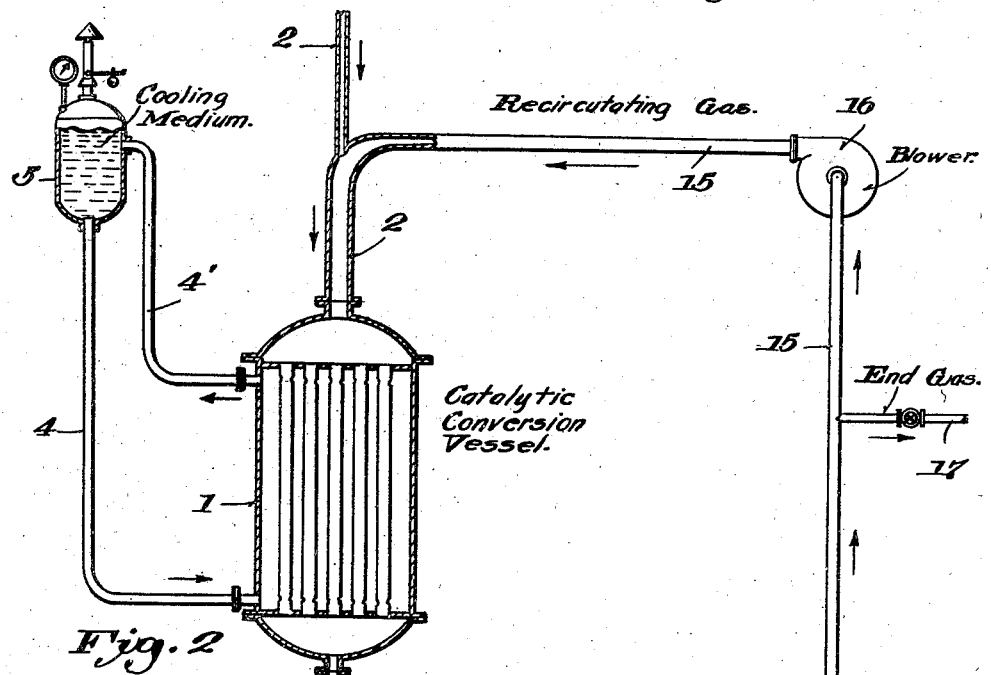
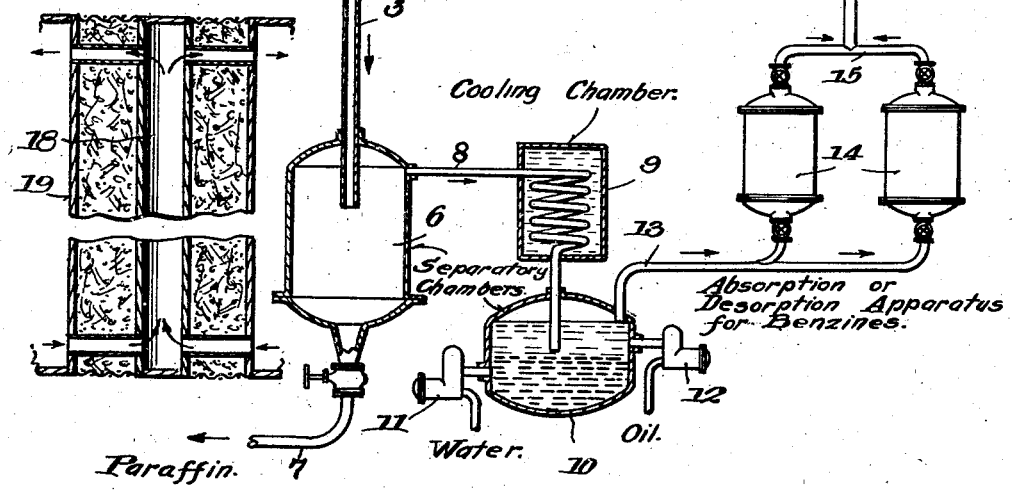
Inventor
Wilhelm Herbert,
By Bailey & Larson
Attorneys Patented Dec. 3, 1940

2,224,049

UNITED STATES PATENT OFFICE 2,224,049

PROCESS FOR THE PRODUCTION OF HYDROCARBONS

Wilhelm Herbert, Frankfort-on-the-Main, Germany, assignor to American Lurgi Corporation, New York, N. Y., a corporation of New York Application November 24, 1937, Serial No. 176,374
In Germany November 30, 1936

8 Claims. (Cl. 260—449)

This invention relates to a process for the production of hydrocarbons containing mainly solid paraffin.

In the catalytic conversion of gases containing carbon monoxide and hydrogen, with or without pressure and at temperatures below those at which carbon dioxide and methane form the chief products, hydrocarbons of the $C_{10}$ series and downwards, are mainly obtained when operating under conditions designed to lengthen the working life of the contact mass. In many cases, however, a higher yield of hard paraffin is desired, since this product is a valuable starting material for the synthesis of fatty acids.

The catalytic conversion of gases containing carbon monoxide and hydrogen was disclosed through the researches of Franz Fischer and his collaborators ("Ges. Abhandlungen zur Kenntnis der Kohle," published by Girardet, Essen (Ruhr), Germany, 1925–1936). Suitable catalytic agents for this benzine synthesis are the known cobalt catalysts, the production of which has been described, for example by Franz Fischer in the journal "Brennstoffchemie," vol. 12, No. 12 (15.6.31) pp. 225–244. In the processes hereinafter described, use is made, for example, of a catalyst containing 33% of cobalt, 6% of thorium oxide, and 61% of kieselguhr. The production of this catalyst from a nitrate solution of the metals by means of sodium carbonate is described in "Brennstoffchemie," vol. 19, No. 4 (15.2.32), pp. 61–80. Any other convenient catalytic agent, may, however, be used, which is suitable for forming methane from such gases at an elevated temperature.

It has been ascertained that most of the methods leading to an increased yield of paraffin shorten the working life of the contact mass, since the mass gradually becomes clogged with products of high boiling point. It has also been established that larger yields of paraffin can be obtained, while not substantially impairing the life of the contact mass, by keeping the latter continuously impregnated with liquid hydrocarbons. This can be effected by periodically or continuously impregnating the contact mass with hydrocarbons, such as the higher-boiling products of the synthesis, e. g. a gasoline distilling above 100° C. at atmospheric pressure.

It is already known it is true, to free exhausted catalytic agents from paraffin by extraction, but this does not furnish the same effects as in the present invention. These results are produced only when a substantial enrichment of the contact mass with paraffin is permanently rendered impossible, since the tendency to form paraffin diminishes enormously as the saturation of the contact mass with paraffin increases. If, for example, the contact mass be extracted only when exhausted, that is, after it has adsorbed from 100 to 300% of paraffin or more, the total recoverable amount of paraffin referred to the total liquefiable hydrocarbons, is only from 5 to 10% at atmospheric pressure. If the paraffin content in the catalytic agent be kept at from 50 to 80%, the amount of paraffin recovered is from 15 to 20%, with reference to the liquid products. If, however, the paraffin concentration of the catalytic agent be kept below 20%, the yield of paraffin amounts to from 30 to 40% of the total quantity of liquid products.

The process of the present invention allows numerous measures for increasing the yield of paraffin to be employed, which otherwise could not be applied with advantage. Among such measures may be mentioned:

(1) The use of thicker contact layers, for example of more than 10 mm. ("thickness" of the contact layers here means the distance between two cooling elements of the contact furnace).

(2) The use of elevated pressures, such as from 2 to 300 atmospheres and over (preferably from 10 to 50 atmospheres).

(3) A longer period during which the reaction gases remain in the contact mass, for example more than one minute—for example from 3 to 10 minutes approximately in proportion with the elevation of the pressure.

(4) The use of highly concentrated contact masses, such as those containing more than 40% by weight of hydrogenating metals.

(5) The use of gas mixtures with an excess of carbon monoxide over hydrogen, above the ratio 1:2.

(6) The use of gas mixtures containing more than 90% of carbon monoxide plus hydrogen.

The paraffin content can also be kept low by other methods than extraction. For example, a high vacuum may be periodically established in the contact furnace without or with passing hydrogen through the furnace or it may be steamed-out at regular intervals. This treatment takes place at temperatures of the synthesis, e. g. 180° C. or even higher, e. g. 200–250°.

Capillary means also may be employed for removing the paraffin. For example, porous rods or the like (composed, for example, of ceramic material or fritted metal) may be inserted in the interior of the contact mass where they become impregnated with paraffin and conduct the latter downwards so that, for example, it will drip from the rods or the like. It is advantageous to keep the rods, tubes or the like, warmer at the bottom than the top, the dripping of the paraffin being thereby facilitated and a capillary drop established, between top and bottom, which facilitates the diffusion of the paraffin out of the contact mass. The porous bodies may also be heated below to such an extent as to vaporise the paraffin from their surface, this measure also intensifies the capillary flow of liquid paraffin.

The most simple method of carrying out the hereindescribed process is to pass the reaction gases from below upwards through the contact furnace or reaction chamber which is filled with the catalytic agent and (if desired) partially to cool the gases prior to or on their discharge at the top of the furnace. For example, if the exhaust gases be cooled from a reaction temperature of 200° C. down to 100 to 150° C., the higher hydrocarbons alone will be condensed and flow back on to the contact mass, whilst steam and benzine vapours will be led away. The reflux oils, on their part, effect the continuous extraction of the paraffin formed in the contact mass, and this paraffin will flow off, in liquid form, at the bottom, that is, countercurrent to the gases. By this means the paraffin concentration in the mass is lowered, and the tendency to form paraffin increased in consequence. On the other hand, the oils flowing back into the contact mass effect an additional formation of paraffin.

In previous normal operation of the catalytic conversion without a pressure considerably exceeding the atmospheric pressure and without additional impregnation or irrigation of the contact mass, the mass very soon becomes laden with paraffin to the extent of 100–300% and even more of its own weight, the paraffin having a melting point exceeding 50° C. In carrying out the invention, the maximum yield of paraffin is obtained when care has been taken to prevent the contact mass from becoming burdened with more than 80% (preferably not more than 50%) of paraffin, and advisably less than 20% of the latter.

When the reaction gases are passed upwardly through the contact furnace filled with grains of a suitable catalytic agent, the same reactions occur, at first, in the zone of entry of the gases, as in the case of the known method of operating wherein the gases are passed downwardly through the catalyst.

The products of these reactions, however, flow downwards without having any opportunity of injuring further portions of the contact mass. Substantially, no reaction products, other than such as are vaporous at the reaction temperature, can ascend. At the end of a short working period the contact mass will be in such a condition that the uppermost layers, necessary for good catalysis, are still in a highly active condition, whilst the injury to the contact mass progresses upwardly only gradually.

Consequently, the gases are utilised to greater advantage and a higher yield of high boiling products per cubic metre of synthesis gas is obtained. This effect is increased by the circumstance that the highly concentrated admission gas encounters the contact mass that has suffered the greatest damage, whilst the gas which has already been extensively treated and is permeated with reaction products, encounters highly active contact material in the upper part of the furnace. The reaction is thus rendered more uniform, and overheating phenomena, which are always accompanied by the formation of by-products and damage to the contact material, are reduced to a minimum.

A particular advantage of the present process is obtained when the reaction gases are employed under elevated pressure, say above 2 atm., preferably above 10 atm. Whereas, when the gas is passed from above downwards, under pressure, the injury to the contact mass progresses so rapidly that economical employment of a pressure considerably above the atmospheric pressure was hitherto considered hardly possible, the present process enables pressure, with all its advantages, such as increased velocity of reaction, smaller apparatus, and so forth, to be employed in a particularly favourable manner.

Another way to keep the enrichment of the catalyst with paraffin below 100% of the weight of the catalyst free from paraffin consists in keeping the partial pressure of the hydrocarbons which are liquefiable at the temperature of reaction (which means that the critical temperature is above the reaction temperature) so low within the contact furnace and the gas respectively that the partial liquefaction of these products at the temperature of the contact furnace is substantially diminished.

The enrichment of the catalytic agents with paraffin is influenced by the pressure, the temperature and the contraction of the volume of the converted gas. As a change of the working pressure also changes the solubility of the gases in the liquids on the contact mass, the diminution of the partial pressure of such hydrocarbons which are liquefiable at the reaction temperature will not be constant for all conditions of working. The diminution of the partial pressure is not a linear function of the pressure applied, because the chemical reaction is also influenced by the partial pressure. In order to keep the enrichment of the contact mass with paraffin below 100% of the weight of the contact mass free from paraffin it is now necessary to keep the partial pressure of the hydrocarbons liquefiable at the reaction temperature below $0.2\sqrt{p}$ in the hot gases, preferably below $0.08\sqrt{p}$, if $p$ means the positive working pressure in atmospheres.

It is also possible to change the composition of the hydrocarbons in the direction from higher boiling hydrocarbons to lower boiling gasoline-like hydrocarbons by diminishing the partial pressure of the hydrocarbons liquefiable at the reaction temperature e. g. below 0.7 atmospheres, especially below 0.3 atmospheres, if the pressure applied is about 10 atmospheres above the atmospheric pressure. The gasoline produced under these conditions has valuable antiknock properties. If very small partial pressures are applied it is possible to produce benzine and gasol-hydrocarbon (propane, propylene etc. substantially exclusively).

The means to reduce the partial pressure of the hydrocarbons liquefiable at the reaction temperature are e. g.: increasing the amount of gas passed through the catalyst by recirculating the end gas into the fresh reaction gas and/or separating a part or all the reaction products, e. g. including the reaction water and the $C_3$ and $C_4$ hydrocarbons (so called gasols) and/or dividing the synthesis in a plurality of stages, whereby each contact stage delivers only a quantity of liquefiable reaction products on the contact mass in the maximum defined according to the invention.

On the other hand it is also possible to perform the synthesis under such conditions that the formation of paraffin instead of oil and gasoline-like products is considerably increased, if
(1) The reaction temperature is kept below 170° C., suitably below 155° C.
(2) The working pressure is higher than 5 atmospheres suitably 10 to 100 atmospheres and
(3) The amount of gas passed through the catalyst at a pressure $p$ is kept smaller than $0.2\ p$, suitably below $0.1\ p$ normal litres per hour and per one gram of metal in the contact mass, whereby the normal litre of gas based on 760 mm. Hg and 0° C. is calculated only on the content of carbon monoxide and hydrogen in the reaction gas, other constituents of the gas being deducted in the calculation of the total volume.

Example 1 kg. of a contact mass consisting of 40% metallic cobalt, 6% thorium oxide, and 54% kieselguhr as supporting mass is treated in a contact furnace in which cooling elements are arranged in known manner at a temperature of 152° C. and at a pressure of 40 atmospheres with 400 normal litres carbon monoxide and hydrogen in the ratio 1:2 contained in a gas mixture. 60 grams paraffin are formed per hour which drips out of the contact and which has a chilling point of 57° C. Beside small quantities of oil and benzine (gasoline) are formed and the formation of gasol is nearly completely stopped. After a longer period of working the activity of the contact abates and the contact is then extracted by a solvent suitably under pressure. By this extraction further 3–4 kg. paraffin with a chilling point above 100° C. is produced. The extraction of the paraffin can be done continuously according to the invention by a solvent, e. g. synthetic gasoline.

A further considerable advantage of the present process resides in the fact that, in effecting the necessary regeneration of the contact mass from time to time, by the passage of steam, hydrogen, nitrogen, oxygen or other gases, or by irrigation with solvents, the counterflow principle can now be easily employed. Hitherto, it was necessary to perform this regenerative treatment from above downwards, and therefore with a flow coincident, in direction, with the then customary course of the gases, since it was only in this manner that the substances—for the most part liquid—to be expelled from the contact mass can drop. The effect of such a regenerative treatment must therefore have been incomplete, unless uneconomically large quantities of the regenerative media were employed. Now that, in accordance with the invention, the normal progress of the reaction is from below upwards, and the injury to the contact mass also proceeds in the same direction, it is possible, whilst retaining the customary regenerative treatment from above downwards, to operate in counterflow and, at the same time, not only economise very considerably in regenerative media, but also to improve the quality of the regenerated contact material.

In the accompanying drawing, apparatus suitable for carrying out the process of the present invention is diagrammatically shown.

Fig. 1 shows, diagrammatically, apparatus which may be employed for applicant's improved process; and Fig. 2 is a partially broken away longitudinal cross sectional view of a catalyst supporting tube employed in the catalytic conversion vessel.

In such drawing, 1 designates the conversion vessel which is provided with tubes holding a granular catalyst. These tubes are composed of two concentrically disposed tubes 18 and 19 with the catalyst packed in the annular space therebetween, as shown in Fig. 2. A cooling medium is supplied to the conversion vessel 1 from the vessel 5 by means of conduits 4, 4', such cooling medium passing through the interior of the inner tube of the two concentric tubes and around the outside tube so as to afford effective cooling of the catalyst during the conversion. Tube 2 serves to supply the conversion vessel with fresh synthesis gas as well as for a portion of the end gas through the conversion vessel. Conduit 3 serves to introduce the gases after conversion into vessel 6 wherein paraffin is condensed and removed through outlet 7. Conduit 8 serves to lead the remaining gases through the cooling chamber 9. The oils and water condense in the separatory vessel 10, the oil being withdrawn at 12 and the water at 11. The remaining gases leave vessel 10 through conduit 13 and are introduced into vessels 14 which are provided with active carbon which serves to remove benzine therefrom. The end gases leaving vessels 14 are recirculated back to conduit 2 through conduit 15 with the aid of the blower 16. Outlet 17 serves for the removal of a portion of the end gases from the cycle.

An example of carrying out applicant's process with such apparatus would be as follows: 1,000 normal cubic meters of fresh synthesis gas containing 32% CO, 64% $H_2$ and 4% N are introduced through tube 2 and are mixed with 2,000 normal cubic meters of recycled end gas containing 28% CO, 56% $H_2$, 11% N and 5% $CH_4$, so that 3,000 normal cubic meters of gas enter the conversion vessel 1. The pressure of the gases is seven atmospheres and the reaction temperature is maintained at 200° C. The catalyst employed consists of 33% cobalt, 6% thorium oxide and 61% kieselguhr.

In the conversion vessel 650 normal cubic meters of the gas are converted to produce hydrocarbons and water.

The reaction products are then withdrawn from the gases, passing out of the conversion vessel. Of the remaining 2,350 normal cubic meters of the end gas, 350 are removed from the cycle through the tube 17, and the remaining 2,000 are again recycled.

For each 1,000 normal cubic meters of fresh synthesis gas introduced into the cycle, 140 kilograms of liquefiable hydrocarbons are produced whose critical temperature is above 200° C. The mean molecular weight of these products is 140, and a normal cubic meter of pure vapor thereof weighs 6 kilograms, and a cubic meter at the pressure employed weighs 42 kilograms, and therefore the volume of the products whose partial pressure is to be maintained low in accordance with the invention is 3.3 cubic meters. The volume of the end gas of the conversion vessel is 2,350 normal cubic meters or 335 cubic meters at the pressure employed. About 15 cubic meters must be added to this amount for the volume of all of the reaction products of the conversion. The partial pressure of the liquefiable hydrocarbons in the gases leaving the conversion vessel therefore is $$\frac{3.3 \times 7}{350} = 0.006 \text{ atmosphere}$$

which would be considerably less than the partial pressure $0.08\sqrt{p}$, recited in the specification, which would be about 0.21 atmosphere.

I claim:

1. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, the steps comprising in combination, employing a superatmospheric pressure for said catalytic conversion and recirculating the end gas of said catalytic conversion after separating therefrom at least a part of the water and hydrocarbons formed by said conversion in sufficient quantities that the partial pressure of the liquifiable hydrocarbons formed in the hot gases, leaving said catalytic agents and which have a higher critical temperature than the temperature employed in the catalytic conversion, is maintained below $0.2\sqrt{p}$, wherein $p$ designates the positive pressure in atmospheres applied during said conversion.

2. A process in accordance with claim 1, wherein the catalytic conversion is divided into a plurality of stages, the partial pressure of the liquifiable hydrocarbons formed in the hot gases leaving the catalyst of each stage which have a higher critical temperature than the temperature employed for the conversion, being maintained below $0.2\sqrt{p}$, wherein $p$ designates the positive pressure in atmosphere applied during the conversion.

3. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, the reaction temperature of said catalytic conversion being maintained constant during such conversion by cooling the said catalytic agents indirectly, the steps comprising in combination, employing a superatmospheric pressure for said catalytic conversion, and recirculating the end gas of said catalytic conversion after separating therefrom at least a part of the water and hydrocarbons formed by said conversion in sufficient quantities that the partial pressure of the liquifiable hydrocarbons formed in the hot gases leaving said catalytic agents and which have a higher critical temperature than the temperature employed in the catalytic conversion, is maintained below $0.2\sqrt{p}$, wherein $p$ designates the positive pressure in atmospheres applied during said conversion.

4. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, said catalysts consisting of a hydrogenating metal of the eighth group of the periodic system, difficultly reducible metal compounds and a preponderance of carrier substances, the steps comprising in combination, employing a superatmospheric pressure for said catalytic conversion and recirculating the end gas of said catalytic conversion after separating therefrom at least a part of the water and hydrocarbons formed by said conversion in sufficient quantities that the partial pressure of the liquifiable hydrocarbons formed in the hot gases, leaving said catalytic agents and which have a higher critical temperature than the temperature employed in the catalytic conversion, is maintained below $0.2\sqrt{p}$, wherein $p$ designates the positive pressure in atmospheres applied during said conversion.

5. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, the steps comprising in combination, employing a superatmospheric pressure for said catalytic conversion, passing fresh synthesis gases containing carbon monoxide and hydrogen upwardly through the catalyst, cooling the gases subsequent to their passage through the catalyst to form a reflux condensate, passing such condensate over the catalyst, recirculating the end gas of the catalytic conversion after separating therefrom at least a part of the water and hydrocarbons formed by the conversion into the fresh synthesis gas in sufficient quantities that the partial pressure of the liquifiable hydrocarbons formed in the hot gases leaving said catalytic agents and which have a higher critical temperature than the temperature employed in the catalytic conversion, is maintained below $0.2\sqrt{p}$, wherein $p$ designates the positive pressure in atmospheres applied during said conversion.

6. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, the steps comprising in combination, employing a superatmospheric pressure for said catalytic conversion and recirculating the end gas of said catalytic conversion after separating therefrom at least a part of the water and hydrocarbons formed by said conversion in sufficient quantities that the partial pressure of the liquifiable hydrocarbons formed in the hot gases, leaving said catalytic agents and which have a higher critical temperature than the temperature employed in the catalytic conversion, is maintained below $0.08\sqrt{p}$, wherein $p$ designates the positive pressure in atmospheres applied during said conversion.

7. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, the steps comprising in combination, employing a superatmospheric pressure for said catalytic conversion, and a contact period during which the gases remain in contact with said catalytic agents for more than one minute, and recirculating the end gas of said catalytic conversion after separating therefrom at least a part of the water and hydrocarbons formed by said conversion in sufficient quantities that the partial pressure of the liquifiable hydrocarbons formed in the hot gases, leaving said catalytic agents and which have a higher critical temperature than the temperature employed in the catalytic conversion, is maintained below $0.2\sqrt{p}$, wherein $p$ designates the positive pressure in atmospheres applied during said conversion.

8. In a process for the catalytic conversion of carbon monoxide and hydrogen containing gases with catalytic agents suitable, at atmospheric pressure and an elevated temperature below that at which methane would normally be exclusively formed with the use of the same gases and the same catalytic agents, for forming benzine, hydrocarbon oil and paraffin from such gases, said catalysts consisting of a hydrogenating metal of the eighth group of the periodic system, difficultly reducible metal compounds and a preponderance of carrier substances, the steps comprising in combination, employing a superatmospheric pressure for said catalytic conversion, and a contact period during which the gases remain in contact with said catalytic agents for more than one minute, and recirculating the end gas of said catalytic conversion after separating therefrom at least a part of the water and hydrocarbons formed by said conversion in sufficient quantities that the partial pressure of the liquifiable hydrocarbons formed in the hot gases leaving said catalytic agents and which have a higher critical temperature than the temperature employed in the catalytic conversion, is maintained below $0.2\sqrt{p}$, wherein $p$ designates the positive pressure in atmospheres applied during said conversion.

WILHELM HERBERT.